April 20, 1943. H. H. WHEELER 2,316,828
HIGH SPEED CIGAR MACHINE
Filed Jan. 5, 1938 11 Sheets-Sheet 1

INVENTOR
Henry H. Wheeler
BY
ATTORNEY

April 20, 1943.    H. H. WHEELER    2,316,828
HIGH SPEED CIGAR MACHINE
Filed Jan. 5, 1938    11 Sheets-Sheet 2
*Fig 2*
*Fig. 3*   *Fig. 3ª*
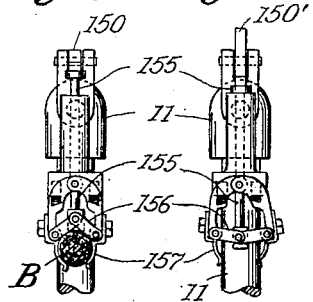
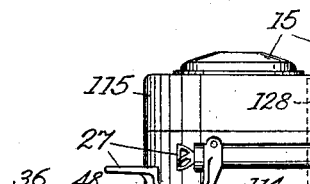
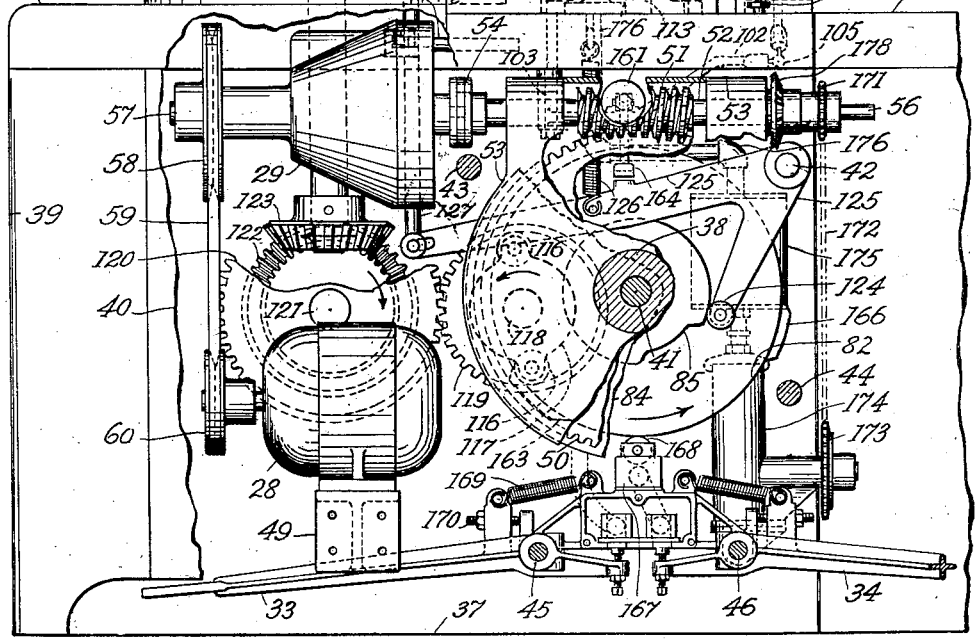
INVENTOR
Henry H. Wheeler
BY George Hastings
ATTORNEY April 20, 1943.　　　H. H. WHEELER　　　2,316,828
HIGH SPEED CIGAR MACHINE
Filed Jan. 5, 1938　　　11 Sheets-Sheet 3

INVENTOR
Henry H. Wheeler
BY Georges S Hartung
ATTORNEY

April 20, 1943. H. H. WHEELER 2,316,828
HIGH SPEED CIGAR MACHINE
Filed Jan. 5, 1938 11 Sheets-Sheet 4

INVENTOR
Henry H. Wheeler
BY
ATTORNEY

April 20, 1943. H. H. WHEELER 2,316,828
HIGH SPEED CIGAR MACHINE
Filed Jan. 5, 1938 11 Sheets-Sheet 7

INVENTOR
Henry H. Wheeler
BY
ATTORNEY

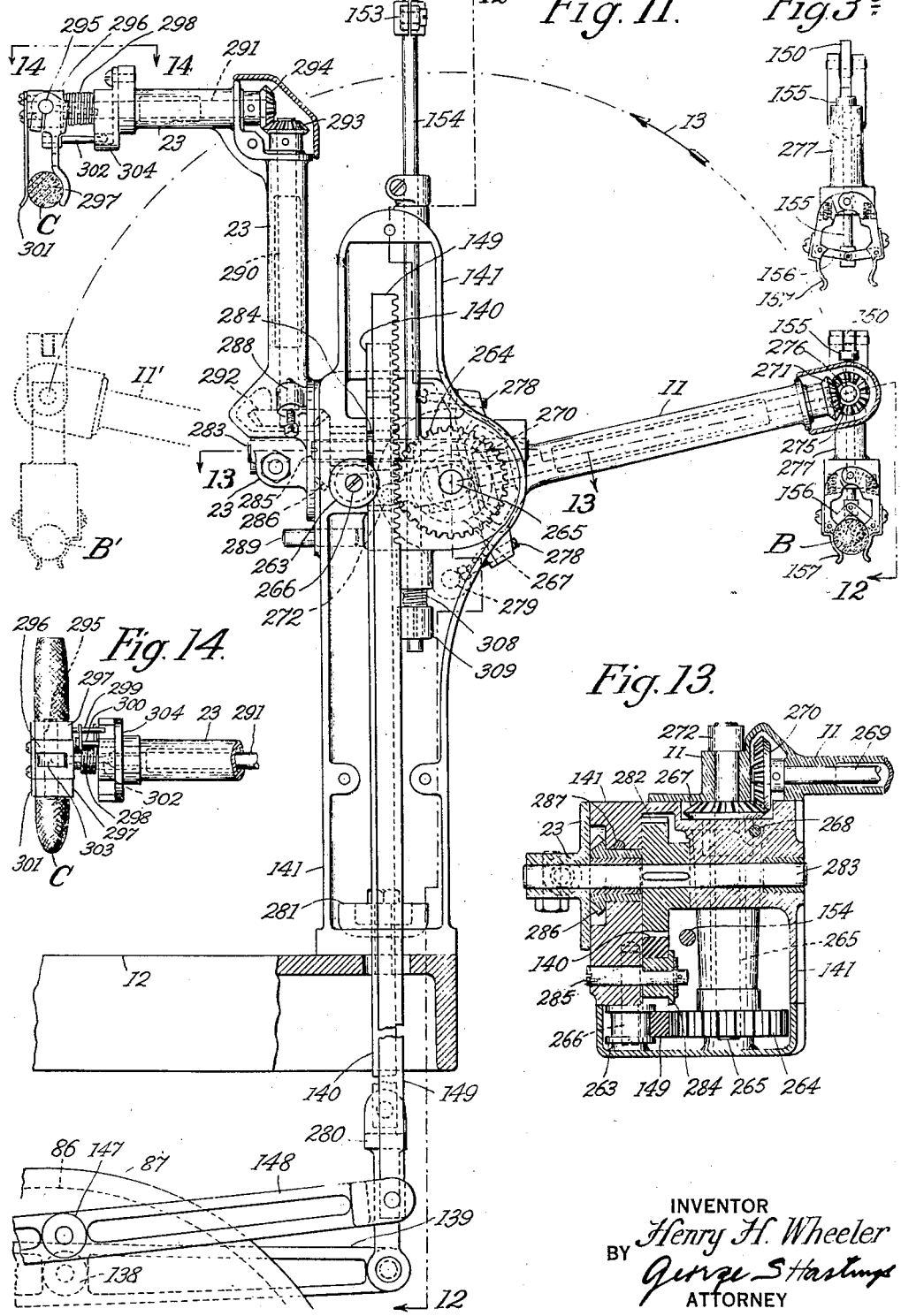

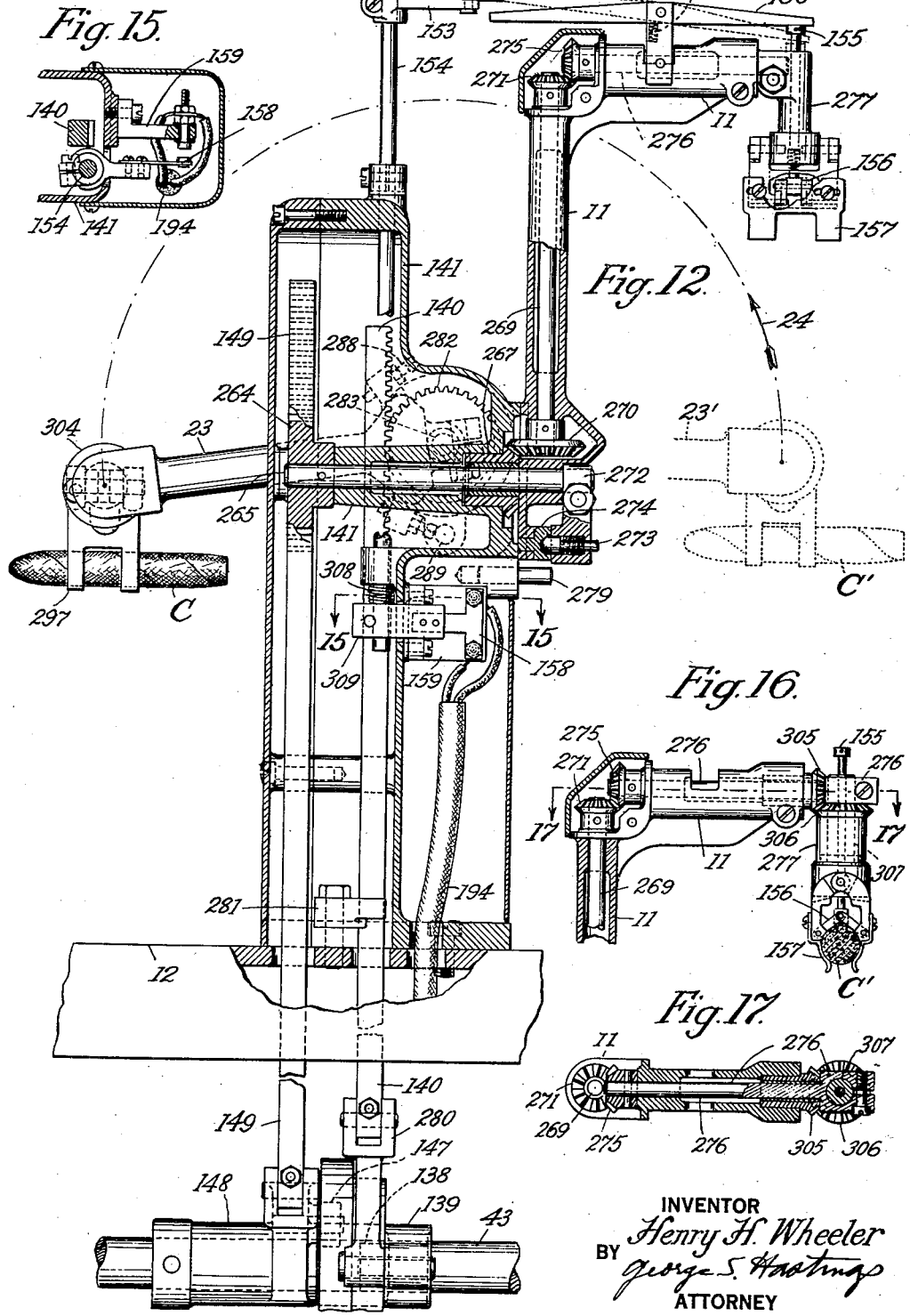

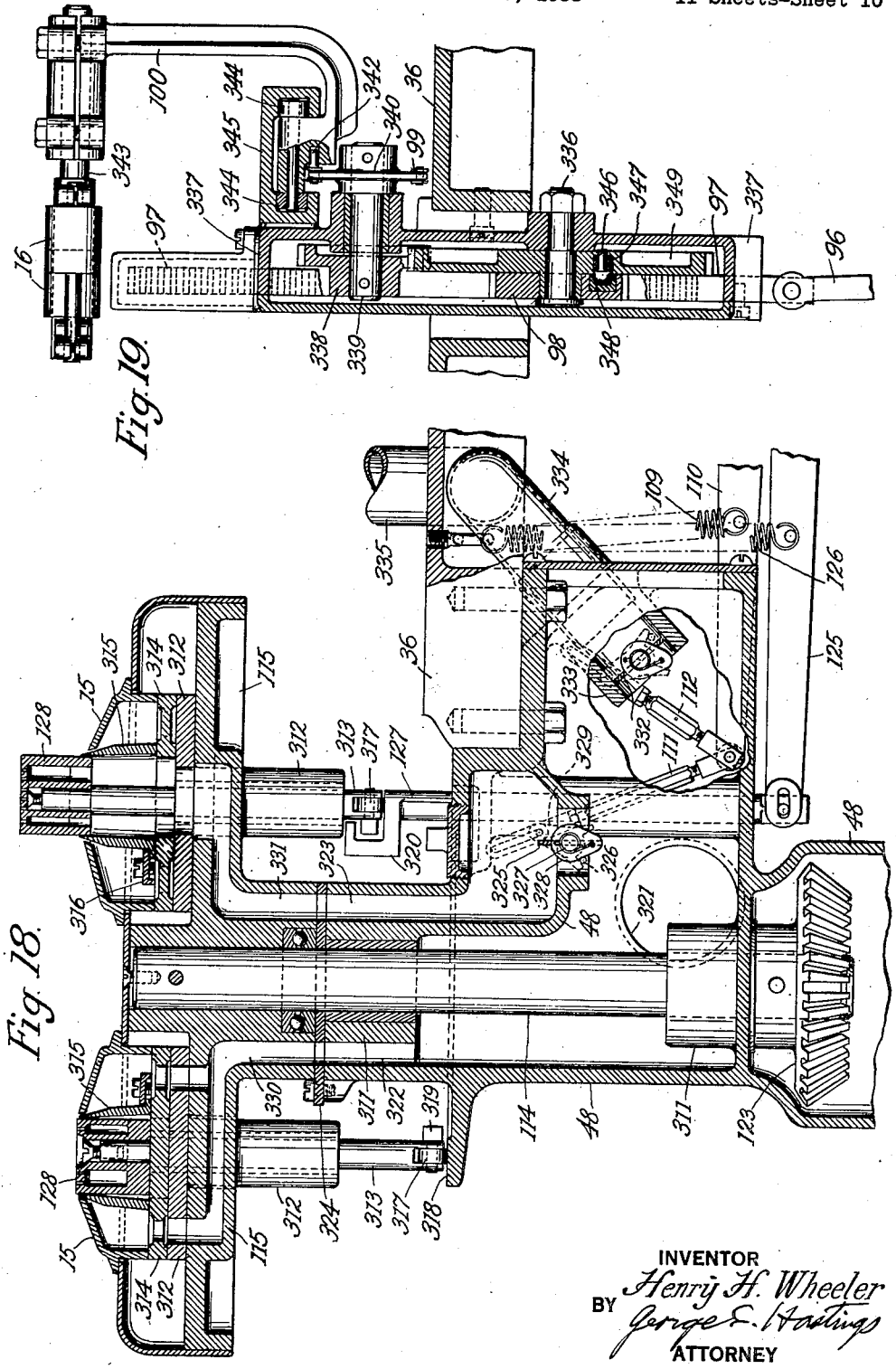

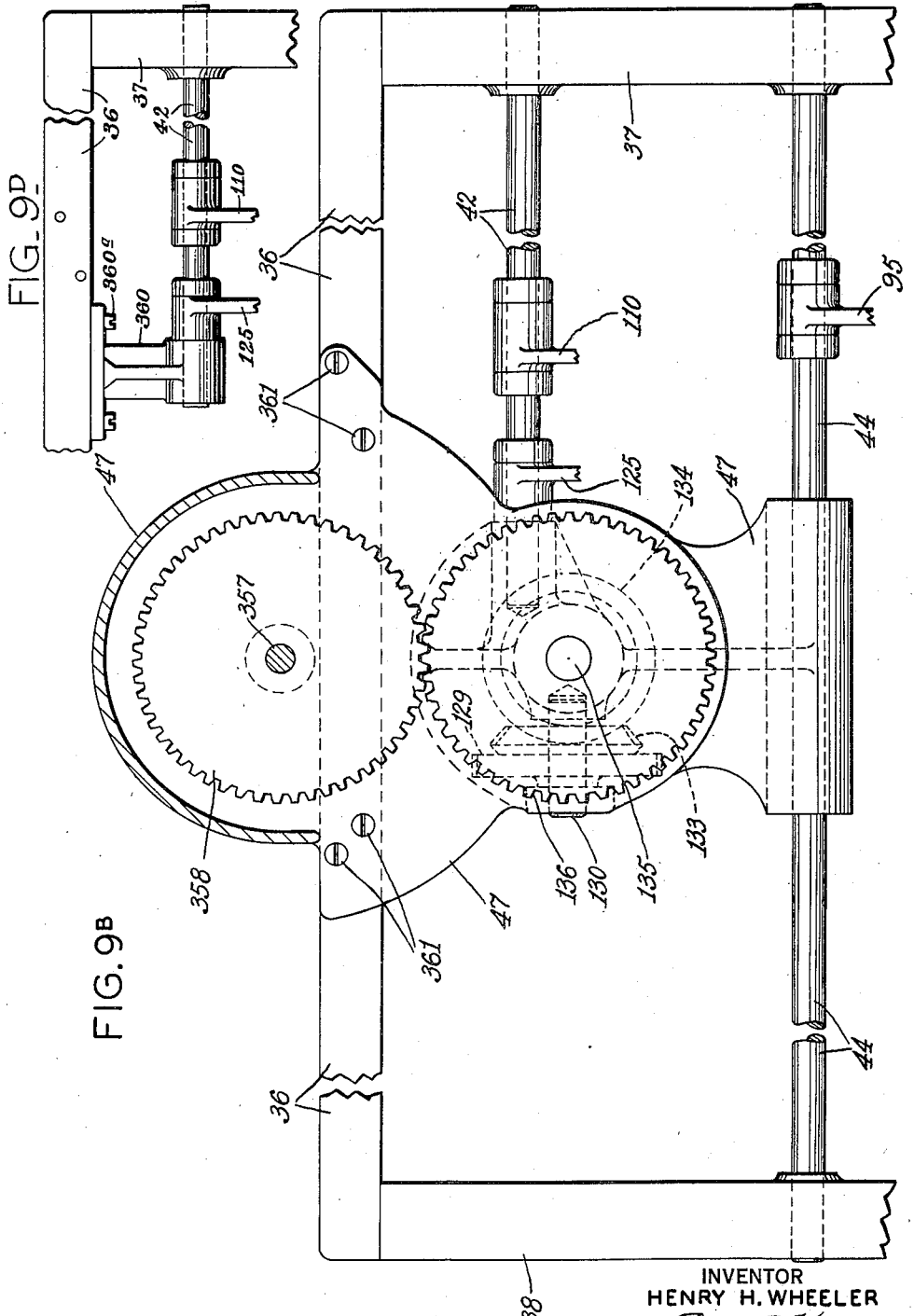

Patented Apr. 20, 1943

2,316,828

UNITED STATES PATENT OFFICE 2,316,828

HIGH SPEED CIGAR MACHINE

Henry H. Wheeler, Brooklyn, N. Y., assignor to International Cigar Machinery Company, a corporation of New Jersey Application January 5, 1938, Serial No. 183,405

23 Claims. (Cl. 131—21)

This invention relates to high-speed cigar rolling machines, and more particularly to a cigar rolling machine provided with mechanism wherein a soft work bunch machine may be detached and a fresh work bunch machine may be substituted one for the other to cooperate with said rolling machine and produce long or short filler cigars with a minimum of changes to the other mechanism.

It is an object of this machine to provide a high-speed cigar machine which operates at a much higher speed than that of existing cigar machines.

Also, since crevices and pockets on machines are difficult to clean, and encourage a dirty machine, all possible moving parts of the machine have been enclosed with a symmetry of outline and plane surfaces that are easily cleaned. Experience has shown that dirt is one of the worst enemies to long wear in a machine and this is particularly true of cigar machines which handle tobacco, which may be coated with field dust and other abrasive materials. If this dust be allowed to remain in the machine it works into bearings and cams and produces rapid wear. Hence, it is a further object of the invention to provide a high-speed cigar machine in which the working parts thereof are substantially enclosed in order to protect them from dust, dirt and other extraneous materials commonly present in tobacco, which therefore results in a machine of unusual efficiency and durability from a point of view of wear and tear on its operative parts.

It is a further object of the invention to provide means for quickly effecting positive removal of waste tobacco products from adjacent tobacco cutting mechanisms of the machine, thereby making it possible for the operator to utilize more time in making cigars, and salvage these waste products in a sanitary state.

It is an additional object of the invention to provide a cigar machine and to arrange the drive thereof so that a rolling unit may be selectively attached to either a long or a short filler bunch forming device whereby either a complete long filler or short filler cigar machine results.

Another object of this invention is to provide a rolling machine with drive clutch control means, both hand and foot, at convenient points, so that when used with either a long filler bunch machine or soft work bunch machine, they will be accessible to the bunch machine operator without change or connection. This makes it possible to use either type bunch machine without changing the rolling end.

The clutch of the illustrated embodiment of the invention is provided with a continuously running motor driven shaft which projects through a housing, where a coupling connects it to the drive shaft of the short filler or soft work bunch machine. In the interior of the clutch housing a sun pinion attached to this shaft drives the gears of a planetary system which are connected to a sleeve which also projects through the housing. A coupling attached to this sleeve provides the driving means for the long filler or fresh work bunch machine, whenever it is associated with the rolling machine. The clutch, which is shown herein by way of example, has an internal expanding brake shoe working on an internal gear within which the planetary gears travel to drive the sleeve. When the brake is released, the planetary gears drive the internal gear. The brake band is expanded by a screw and lever actuated by an electric solenoid controlled either by manual or automatic switches.

The invention also contemplates the provision of a cigar rolling machine having associated therewith a soft work bunch forming device wherein control means on the rolling machine are adapted to coordinate with controls on the soft work bunch forming machine.

According to the present invention a cigar rolling machine is provided with driving mechanism so constructed that by juxtaposing either a long or a short filler cigar bunch forming mechanism adjacent thereto, the working parts thereof may be joined together by means of a coupling mechanism in order that the cigar rolling machine can be operated in conjunction with either of said bunch forming mechanisms. It is, therefore, a further object of the invention to provide a cigar rolling machine with means for driving either a long filler or a short filler bunch machine in synchronism therewith and in order that all operative parts of the bunch making machine may co-ordinate with the operation of the rolling machine.

In the machine of this invention, in order to achieve the object of interchangeability, the illustrated embodiment shows a rolling machine having an electrically controlled mechanical clutch by which means the drive is transferred, from a continuously rotating solid drive shaft which is arranged to drive a soft work bunch forming machine, to a hollow shaft which is concentric with the solid shaft but which is normally stationary. By means of a suitable coupling, the drive of the hollow shaft can be transmitted to a long filler bunch forming machine. When the rolling machine is operated with a long filler cigar bunch forming machine therefore the hollow coupled shaft is driven in synchronism with the hollow driven shaft of the clutch at a speed depending upon the speed of said shaft and the gear ratio of the clutch whereas with respect to the operation of a short filler bunch forming machine coupling with the rolling machine it is driven continuously from the motor at a different speed determined by the motor speed by the ratio of the drive pulley. The clutch is controlled by a driving ring through a solenoid which responds to a number of manual, foot and limit switches, the opening of any one of the manual switches stops the machine in any position while the limit switch stalls the machine at zero if the manual switches are closed.

When the machine operates as a fresh work machine, the foot switches cannot stop the machine, once it is started; the machine is stopped once each cycle by a limit switch. In order to restart the fresh work machine a pair of foot pedals are depressed which again close the circuit and start the machine. It is to be noted that even though the limit switch operates at the end of each cycle, the machine can be kept in continuous operation by maintaining the foot pedals depressed. However, when the machine, through proper substitution of units becomes a soft work machine, due to the fact that there are certain points in the cycle when the hands of the operator at the rolling station might possibly be in danger of being injured, one of the foot pedals has been arranged to stop the rolling machine in any position if any danger to the operator should arise. This arrangement also makes it possible for the bunch operator to stop the operation of the rolling machine and catch up, in the event that she has fallen behind in placing bunches in the turret pockets. Thus, one motor attached to the cigar rolling end will drive both the rolling and bunch making machines at their proper speeds and each machine can be run independently of each other from that motor.

Accordingly, it is a further object of the invention to provide driving mechanism which may selectively drive either a long or short filler cigar bunch forming machine, and to provide a number of switch controls which allow stoppage of the machine, in any desired position.

It is an additional object also to provide a single driving motor and selective driving means for operating a cigar bunch rolling machine in conjunction with either a long or a short filler bunch forming machine as may be desired.

In order to make it possible to later substitute either a long for a short filler bunch forming machine, or vice versa, for cooperation with the cigar rolling machine, transfer mechanism which transports bunches from the bunch forming machine to the wrapping station of an improved type, has been provided so that no change in the transfer structure is necessary, except to change the type of gripper unit head, whenever a substitution is made. This has been accomplished by so arranging the bunch rolling device of the rolling machine, and the bunch concentrators of the long and short filler bunch forming machines that the bunch transfers of the rolling machine can be used with a minimum of change as mentioned above.

This invention also consists in the provision of novel means for controlling the clutch of the cigar rolling mechanism which is responsible for the driving of either the long or the short filler bunch forming mechanism. These control means consist of a rotating member which cyclically operates an electric switch which is a part of the machine so as to interrupt the operation thereof at least once during each cycle of the machine during its operation. Additional means are also provided for maintaining the continued operation of the machine regardless of the functioning of the device which interrupts the operation cyclically.

Accordingly, it is a further object of the machine to provide improved control means which will maintain the operation of the machine at its most efficient rate of speed.

With these and other objects, not specifically mentioned, in view, the invention consists of certain constructions and combinations which will be set forth more in detail in the specification and then described more fully in the claims hereinto appended.

In the accompanying drawings, which form a part of this specification, and in which like characters of reference indicate the same or like elements:

Fig. 2 is a side elevation of the same, on lines 2—2 of Fig. 1;

Fig. 3 is a side elevation on line 3—3 of Fig. 1 showing the carrier portion of the bunch transfer, with a cigar bunch in position;

Fig. 3a is a side elevation similar to Fig. 3, but with transfer empty;

Fig. 3b is a side elevation similar to Fig. 3a, showing specific details of the transfer head;

Fig. 8a is a diagram showing the jogging switch in machine stopping position;

Fig. 8b is a diagram showing the position of the same switch for jogging the machine;

Fig. 8c is a diagram showing the arrangement of the manual or foot switches when the rolling machine is operated with a soft work bunch unit;

Fig. 8d shows a diagram of the circuit used in connection with that of Fig. 8 when the combination is operated as a soft work bunch machine;

Fig. 9a is a side sectional view of the mechanism used in driving and detachably mounting the bunch concentrating turret;

Fig. 9b is a partial front elevation of Fig. 9a;

Fig. 9c is a diagram showing the relationship between the foot pedal and clutch of the short filler bunch making mechanism;

Fig. 9d is a front view showing the means for supporting a fulcrum shaft when the wrapping mechanism is used in a long filler cigar making organization;

Fig. 11 is a side elevation of the bunch and cigar transfer assembly provided with transfers which pick up the raw cigar bunches from the shaping turret of a long filler bunch machine; carry them to the wrapper applying device of the cigar rolling machine, and then transfer the partially completed cigars to the re-roller in which they are softened, trimmed and knurled into finished cigars;

Fig. 12 is a sectional end elevation of the same, on lines 12—12 of Fig. 11;

Fig. 13 is a sectional end elevation of the same, on lines 13—13 of Fig. 11;

Fig. 14 is a top view from line 14—14 of Fig. 11;

Fig. 15 is a sectional plan view on line 15—15 of Fig. 12;

Fig. 16 is an end elevation of the bunch transfer portion of Fig. 12 showing the arrangement of the transfer when the same is used in connection with a scrap bunch machine;

Fig. 17 is a sectional plan view on line 17—17 of Fig. 16;

Fig. 18 is a sectional elevation of the wrapper die turret, on line 18—18 of Fig. 1; and Fig. 19 is a sectional end elevation of the operating mechanism of the wrapper cutting rollers, on line 19—19 of Fig. 1.

Figure 1:
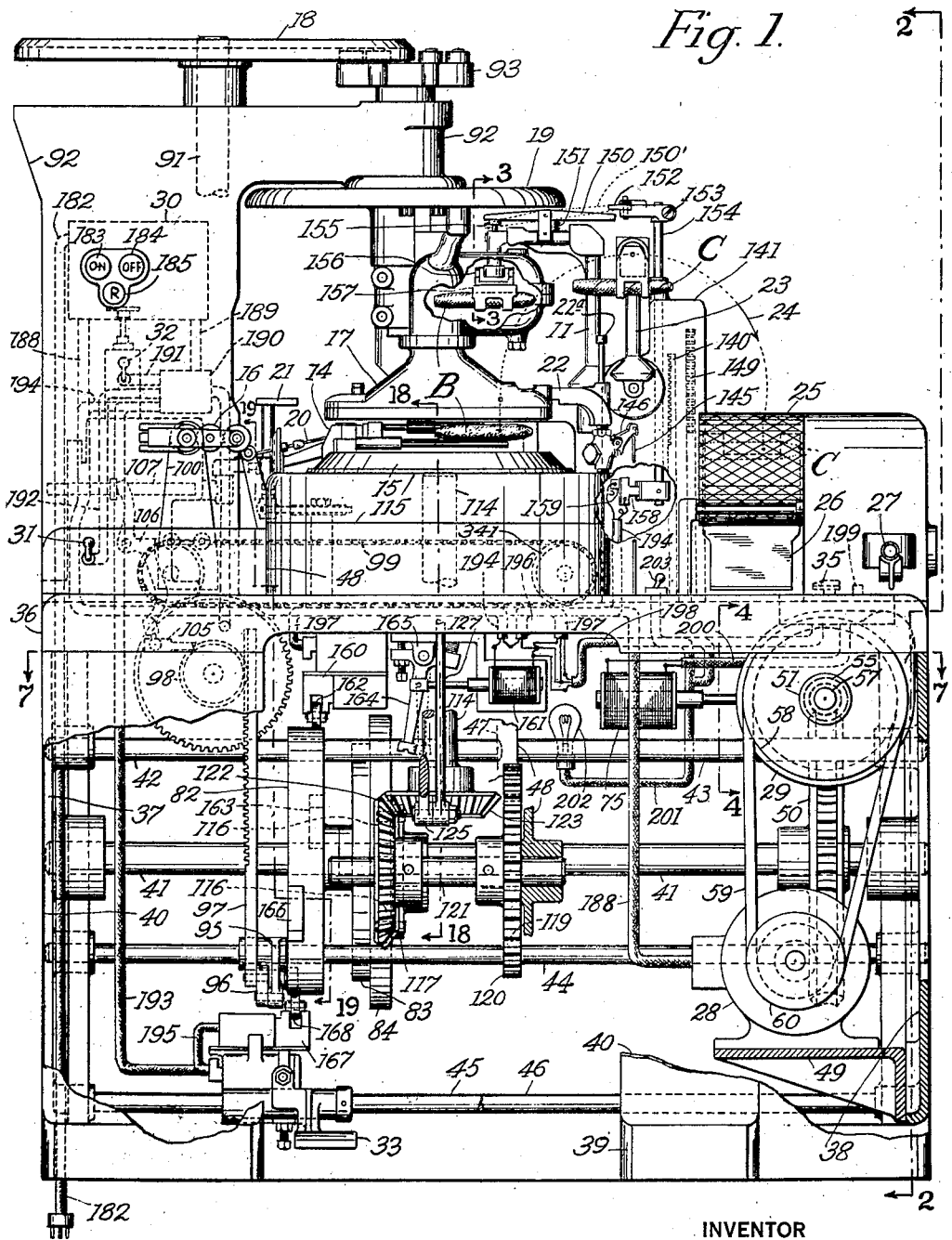
Fig. 1 is a front elevation of the improved cigar rolling machine.
Figure 9:
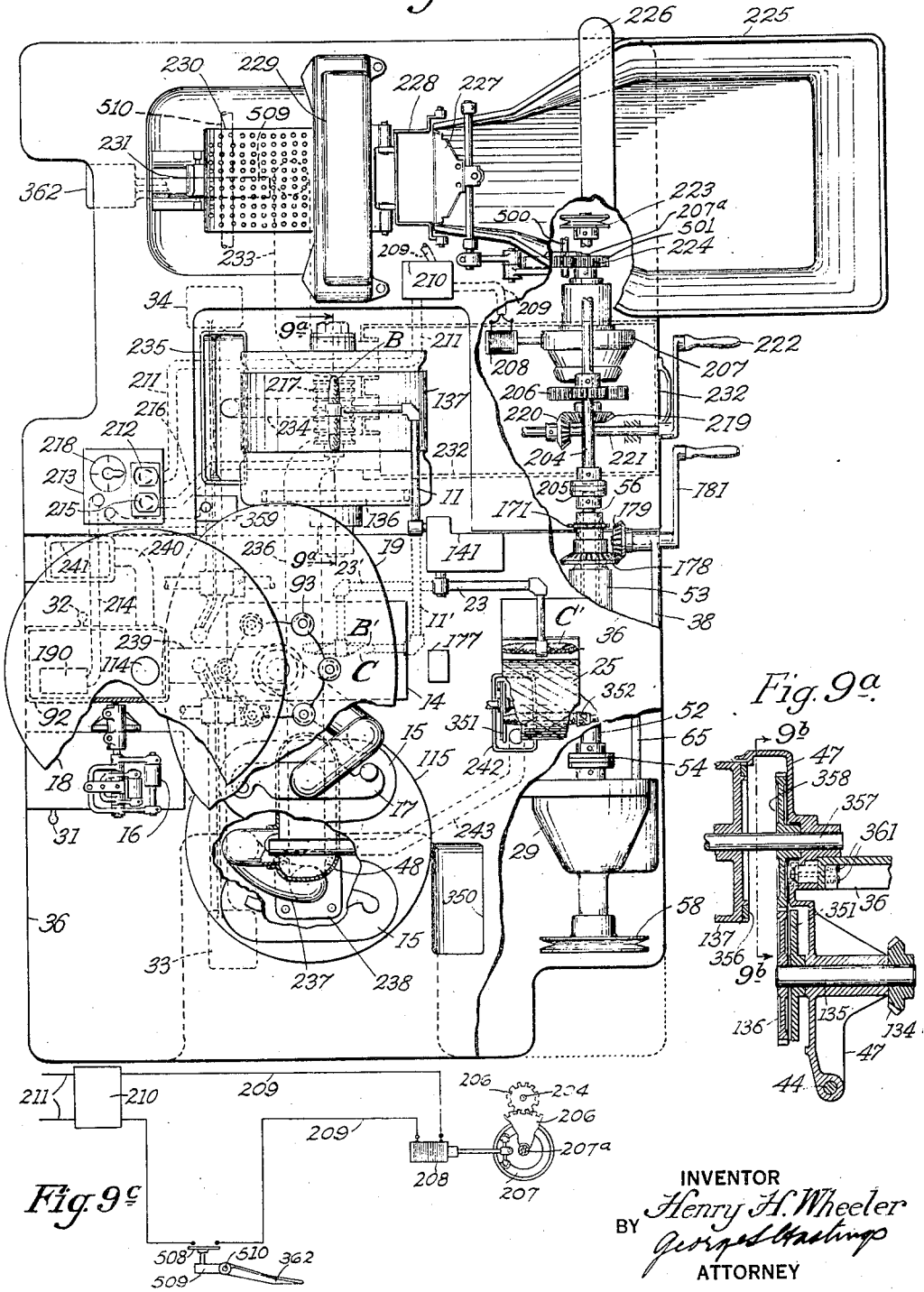
Fig. 9 is a top view, showing the combination of the improved cigar rolling machine with a scrap bunch machine.
Figure 10:
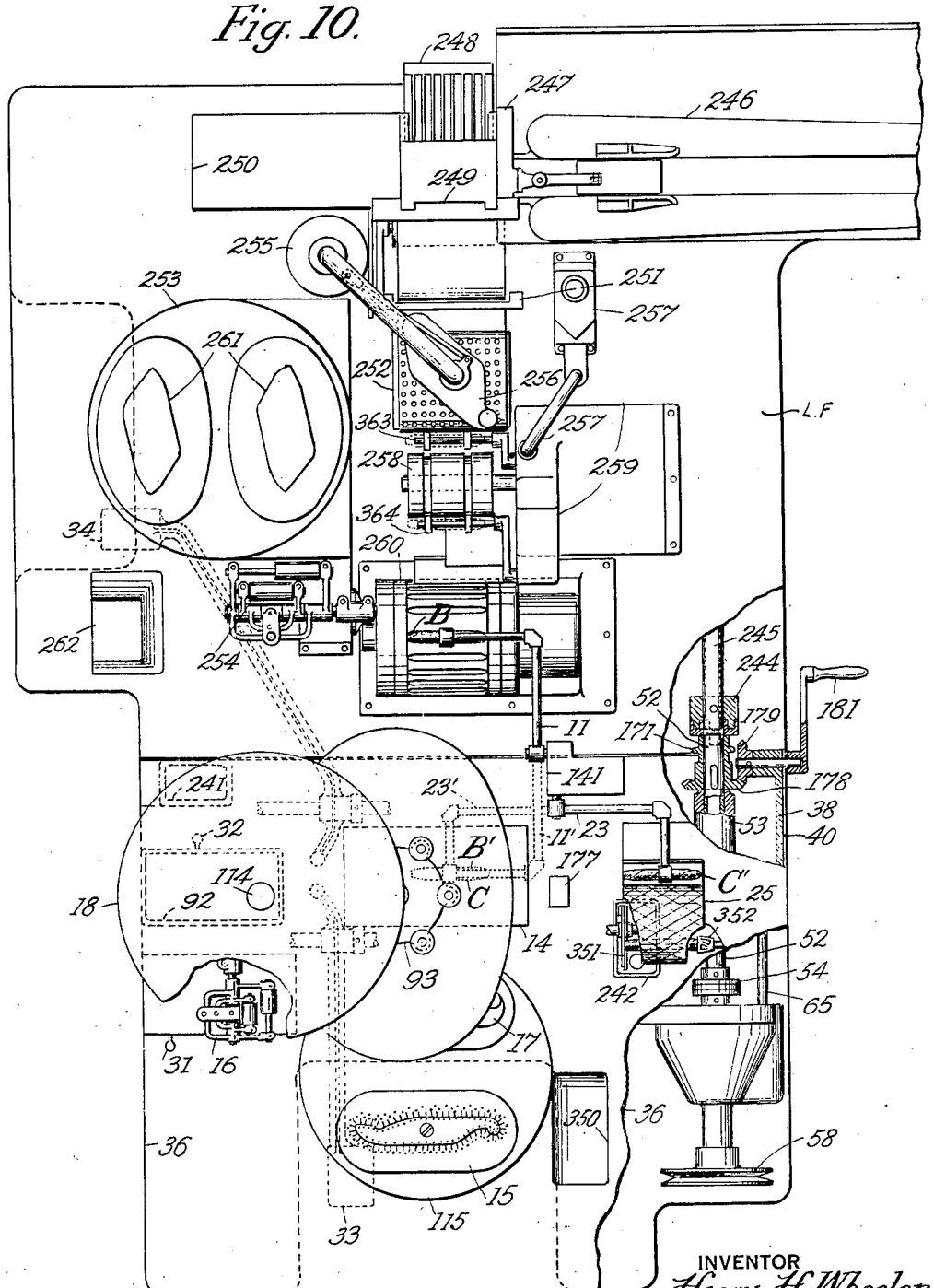
Fig. 10 is a top view similar to Fig. 9 but showing the combination of the improved cigar rolling machine and a long filler bunch machine.

Referring to Figs. 1 and 2, the improved cigar rolling machine consists of a bunch transfer 11 which picks up the finished bunches B from a bunch making machine, which may be either a long or a short filler bunch machine, as shown in Fig. 9 and Fig. 10, and carries them along the path indicated by the arrow 13 in Fig. 2 to the rolling device 14 in which a cigar wrapper cut on the die 15 by the cutting rollers 16 and brought into position by the wrapper carrier 17, guided by cams 18 and 19, is wound around the bunch. The tuck end of the wrapper is placed on the bunch by the tuck-needle 20 in the conventional manner, and its flag end, to which a dab of paste has been applied by the paster 21 on its way to the wrapping device, is expelled from the carrier by a blow-off 22, which may be of the type shown in my co-pending application, Serial No. 102,445, filed September 26, 1936, now Patent No. 2,215,490 granted September 24, 1940. A cigar transfer 23 then transports the wrapped cigar C along path 24, Fig. 1, to reroller 25 (Figs. 9 and 10) in which the wrapper is smoothed and the softened cigar, after being trimmed to size, by knives 351 and treated by knurler 352, is discharged from the cradle 26, to be collected and given a finishing touch in the hand knurler 27 by the operator.

The construction of the rolling device 14 in the embodiment herein illustrated is similar to that disclosed in co-pending application No. 107,792, filed October 27, 1936, by J. P. Durning, which is now Patent No. 2,290,171, granted July 21, 1942; while the wrapper carrier 17 may be of the type described in my co-pending application above referred to. The paster 21 may be similar in construction to that shown in the United States Patent No. 2,012,149, issued August 20, 1935, to H. H. Wheeler, and, therefore, further detailed description of these mechanisms is believed unnecessary.

In the embodiment selected for illustration, the machine is driven by a motor 28 controlled by a starting switch 30 through a clutch 29 which is electrically controlled by conveniently located hand switches 31, 32 and by foot pedal switches 33, 34 and 34', and limit switch 167, the former actuated by the operator of the rolling machine and the latter by the operator of the bunch machine. For convenience in installing and subsequent check-up, a jogging or inching switch 35 is provided, by which the machine can be advanced step by step through increments of a cycle, for checking on the timing, and for making other adjustments of the different parts whenever necessary.

The operating units of the machine are mounted on a base plate 36 suitably supported by side frames 37, 38 and by an end frame 39 which are completely covered by metal sheeting 40. The end frames 37, 38, support a cam shaft 41 and fulcrum shafts 42, 43, 44, 45, and 46, the inner ends of shafts 42 and 43 being supported in housings 47 and 48, respectively, attached to base plate 36. The end frame 38 also carries the bracket 49 on which the motor 28 is mounted. The metal sheeting which encloses the front and sides of the machine preferably is removably mounted in order, both to enhance the appearance thereof, and provide accessibility to the working parts for repairs and desired changes.

Figure 7:
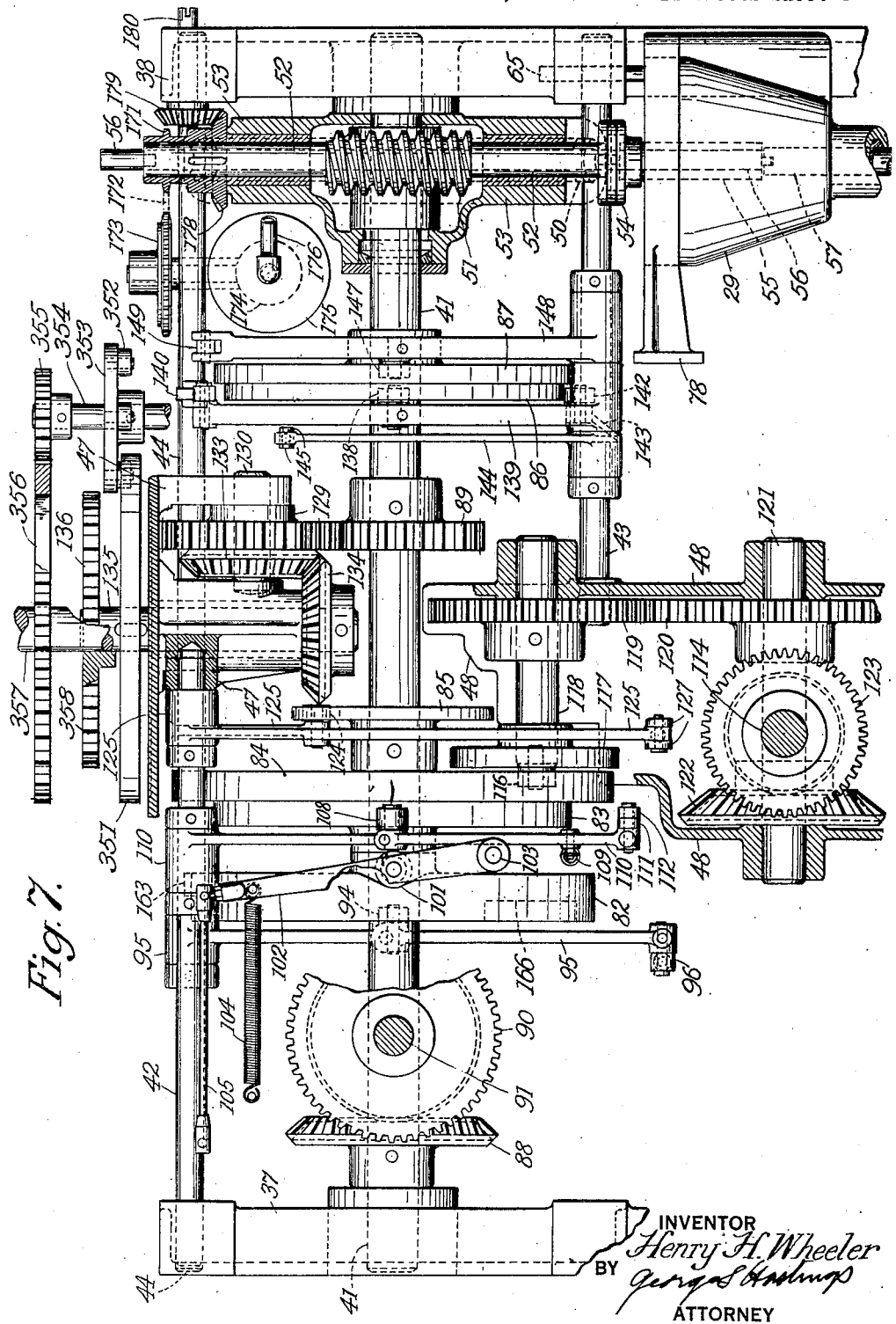
Fig. 7 is a plan view on line 7—7 of Fig. 1, showing the arrangement of the cams, levers, and gears for driving the various parts of the improved machine.

The cam shaft 41 has a worm wheel 50 driven by a worm 51 on a hollow shaft 52 supported in the housing 53 of wheel 50. The shaft 52 is connected by a coupling 54 of conventional design, to the hollow shaft 55 of the clutch 29, a solid shaft 56, passing through shafts 52 and 55, being coupled to a shaft 57 supported by the clutch housing 29 and carrying a pulley 58 driven by a belt 59 from the pulley 60 of the motor 28. The housing 47 is intended to carry bunch shaping turret 137 whenever the rolling machine is used in combination with a short filler or soft work bunch forming mechanism (see Fig. 9a). When the machine is to be converted into a long filler or fresh work combination, the turret 137 and housing 47 are removed, and the inner end of fulcrum shaft 42 is journalled in a bearing bracket 360 (Figure 7) hung from the machine base 36. In making this conversion, shafts 42 and 44 (Figures 7, 9a and 9b) are removed in an obvious manner and withdraw from the frame 37, 38. In the case of shaft 42, one end is withdrawn from a bearing in bracket 47. Upon removal of these shafts and screws 361, the bracket 47 and its associated operating elements for turret 137, as shown in Figures 7 and 9a, can be lifted from the machine, and bracket 360 substituted therefor and hung to frame 36 in any suitable known manner (Figure 9b). Shafts 42 and 44 are then replaced and the cigar rolling part of the machine is then ready to be connected to a long filler bunch making unit to make long filler cigars.

It will be seen, therefore, that the complete conversion of the machine from a short to a long filler cigar machine involves the removal of four screws 361, the disconnection of coupling 205, Figures 9, 9a and 9b, the removal of turret 137 and the substitution of the transfer head of Fig. 12 for that of Fig. 16. All of these changes can be effected with great rapidity and dispatch without necessitating a complete reorganization of the machine and the long filler unit may be juxtaposed against the cigar rolling machine and coupled thereto in working order as shown in Fig. 10. The cigar machine shown in Figure 9 can be converted into a long filler machine by disconnecting coupling 205 and electrical contact 214 whereupon the whole short filler forming mechanism, with the exception of turret 137, can be moved away from the rolling end. By withdrawing shafts 42 and 44 and removing four screws 361, turret 137 can be lifted from the rolling end of the machine, which is then ready for the long filler bunch forming unit. The next step in the conversion is to move unit L. F. (Figure 10) adjacent the rolling end and couple shaft 245 to shaft 52 of the rolling end, thereby completing the change over.

Figure 4:
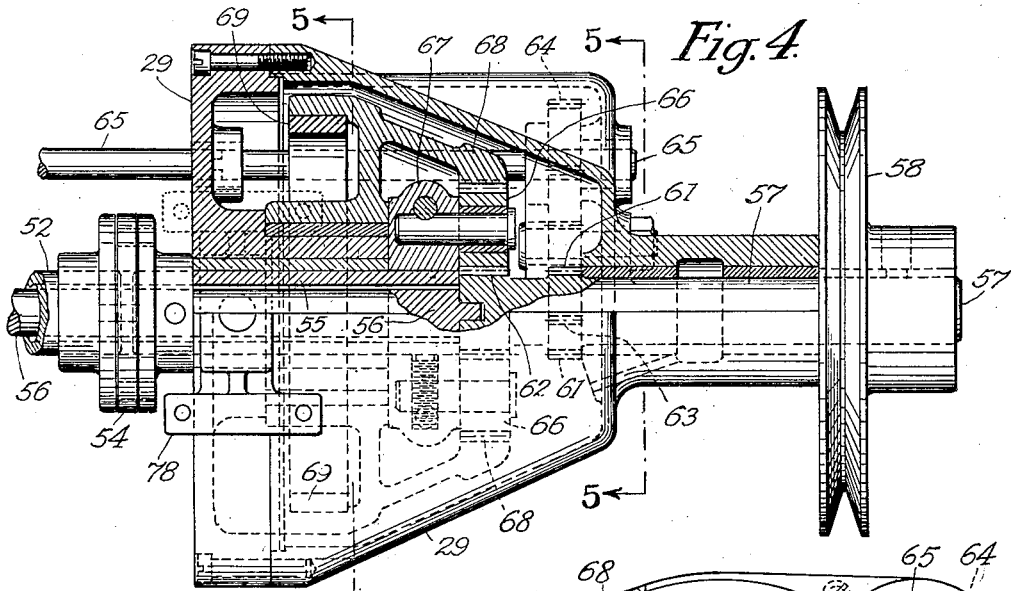
Fig. 4 is a side elevation of the improved driving clutch, on line 4—4 of Fig. 1.
Figure 5:
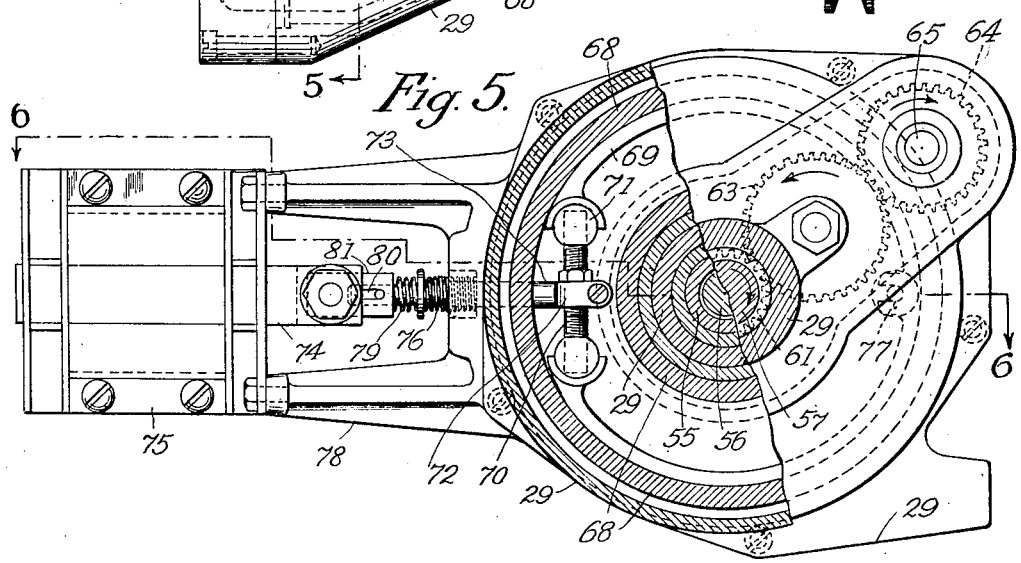
Fig. 5 is a sectional end elevation of the clutch on line 5—5 of Fig. 4.

Integral with shaft 57 are two gears 61 and 62, Figs. 4 and 5, the former meshing with a gear 63 which in turn engages a gear 64, thereby driving a shaft 65 supported in housing 29. The shaft 57 being continuously driven by the motor 28, the shaft 65, which is geared to the hand knurler 27, will therefore, run as long as current is supplied to the motor.

Figure 6:
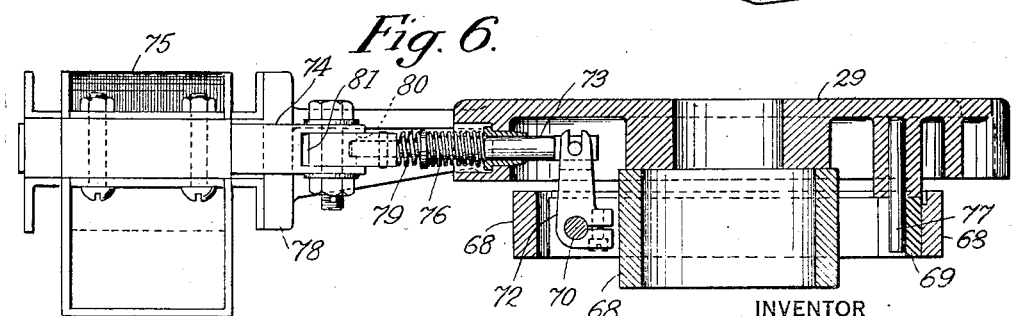
Fig. 6 is a sectional plan view of the same, on line 6—6 of Fig. 5.

The gear 62 constitutes the sun gear of a planetary system in which the intermediate gears 66, carried by a collar 67 fast on shaft 55, run on an internal gear 68, loose on a hub of housing 29, when the said internal gear is held stationary by an expansible ring 69 engaging with the same. The ring 69 is expanded and contracted by a right and left hand screw 70, Figs. 5 and 6, fitted into sockets 71 and turnable by an arm 72 actuated through a rod 73 by the plunger 74 of a solenoid 75. As long as the current in the latter is on, the rod 73 is pushed towards the clutch against the pressure of a spring 76 so as to expand the ring 69, thereby driving the shaft 55; but when the current is cut off, as by opening one of the switches 31 and 32, the spring 76 returns the rod 73 to its normal position, thereby contracting the ring and releasing the internal gear 68 thus permitting the planet gears 66 to turn without driving shaft 55. The ring 69 is held in place by a pin 77 fast in clutch housing 29. The solenoid 75 is mounted on a bracket 78 extending from clutch housing 29. A second spring 79 on rod 73, in conjunction with a slot 80 in its connecting socket 81, serves to absorb any excess forward motion of plunger 74 after the ring 69 is in holding engagement with gear 68. The operating parts of the clutch run partly in oil which is kept within the clutch by means of its casing. It will be noted in this manner that a thin film of oil will always be present between the surfaces of gear 68 and expansive ring 69 which engages the gear to effect the drive. This arrangement insures a clutch of extremely long life, and also provides a very satisfactory friction drive, which in the case of a jam in the machine will slip rather than damage the parts of the clutch.

On shaft 41 are mounted cams 82, 83, 84, 85, 86 and 87, (Fig. 7), also a bevel gear 88 and a spur gear 89. The gear 88 meshes with a bevel gear 90 mounted on a shaft 91 supported in pedestal 92 on base plate 36 (Fig. 1), and driving the main cam 18 of the wrapper carrier 17, the cam 18 in turn guiding the roller wheel 93 of the follower cam 19 which controls the carrier 17, as set forth in the above referred to Wheeler application.

The cam 82, by means of a follower 94 controls a lever 95 fulcrumed on shaft 44, this lever by a link 96 being connected to a rack 97, Fig. 1, which through gears 98, causes the reciprocation of a chain 99, and hence of the carrier 100 of the cutting rollers 16 which is attached thereto. A sectional end elevation of the mechanism for moving the cutting rollers 16 across the wrapper die 15 is shown in Fig. 19. The rack 97 actuated by the link 96 on cam lever 95 meshes with a gear 98 loosely mounted on the hub of a second gear 349 mounted on a stud 336 supported by a frame 337 attached to bed plate 36. The gear 349 meshes with a gear 338 fast on a shaft 339 turning in a bearing of frame 337 and carrying a sprocket 340. This sprocket drives the chain 99 which extends from one side of the wrapper die to a sprocket 341 adjacent the other side, as shown in Fig. 1. To the chain 99, by means of pins 342 protruding therefrom is attached the carriage 100 which carries a stud 343 to which the holder of the cutter rollers 16 is clamped. The arm 100 is provided with rollers 344 by which it is suspended from a track 345 affixed to frame 337 and extending along the chain 99. The gear 349 is detachably fastened in driving engagement with gear 98 by means of a ball-end plunger 346 held by a spring 347 in a steel socket 348 inserted into the web of gear 98, this method of attachment constituting a safety device against accidents to the operator, as the plunger 346 will be forced out of socket 348, thus stopping the chain, in case the rollers or their carrier arm encounter a major obstacle. This arrangement provides a desirable and valuable safety control for the wrapper and binder serving operator since it makes it impossible for them to be injured by the cutting mechanism due to the fact that driving engagement between the carriage 100 and rack 97 is broken whenever an operator's hand or other obstruction placed in the path engages with the moving carriage and stops it. Reciprocation of the carriage once being interrupted will not be reinstated until gear 98 is rotated to seat pin 346 in socket 348.

A second roller 101 held against cam 82 by a lever 102 fulcrumed on a stud 103 in base 36 and tensioned by a spring 104 controls a rod 105 connected to a lever 106, Figures 1 and 7, which operates the plunger 107 of the wrapper paster 21, in a manner similar to that shown in Patent No. 2,012,149, above mentioned.

A roller 108 held against the circumference of cam 83 by a spring 109 attached to a lever 110 fulcrumed on shaft 42 actuates it to reciprocate adjustable pivoted rods 111 and 112 which are attached to the lever at one end and at their other ends are connected with valves controlling suction ports in the housing 48 supporting the turret 115, Figs. 1 and 2, carrying the wrapper dies 15.

In Fig. 18, a sectional elevation of the wrapper or binder forming die mechanism is shown. On turret 115, carried by shaft 114 turnable in bearings 311 of housing 48 and driven by bevel gear 123, are mounted two die holders 312, which may be of a type similar to those shown in my Reissue Patent No. 19,677, granted August 20, 1936, in which are slidable rods 313 supporting the transfer head 128. Plates 314 fastened to die holders 312 carry the die shells 15 and the cutter knives 315, held thereon by clamps 316. The rods 313 have rollers 317 resting on a track 318 which raises the heads 128 above the cutter knives 315 in the die-serving position and causes them to descend below the knife surface in the cutting position. When arriving in the wrapper delivery position, an extension 319 of the studs of rollers 317 engages with a pocket 320 at the end of rod 127, which by means of lever 125, cam follower 124 and cam 85 raises the head 128 with the cut wrapper so that it is lifted into engagement with the suction head 17 of the wrapper carriers. Shortly after the head 128 has been raised to the position shown in Fig. 18, the suction therein is cut off and directed into conduit 334, which feeds it to the leaf section carrier head 17 (Fig. 1) thereby effecting delivery of the wrapper or binder, as the case may be, from head 128.

The suction for holding the wrapper on the die head 128 is supplied by a pipe 321 suitably connected to housing 48 from which ducts 322 and 323 lead to a disk valve 324 fixedly attached to housing 48. The inlet of duct 323 is controlled by a butterfly valve 325 held in the open position against a stop 326 by a spring 327 attached to a collar on the valve shaft and fastened to a stationary disk 328, the said valve being closed at timed intervals by a crank arm 329 engaging with a slot in the rod 111 attached to cam lever 110. In the dwell positions of the intermittently rotating turret 115, port-openings of valve 324 register with ducts 330 and 331 leading to the shell 15 and to the suction head 128 of each die, the rotation of turret 115, in conjunction with the timed action of valve 325 producing the different suction conditions required in different positions. The arrangement of the ducts 322, and 323 and stationary valve 324 may be similar to that shown in my Reissue Patent No. 19,677 mentioned above.

The rod 112 attached to lever 110 operates a butterfly valve 332 which normally closes the inlet of a duct 333 communicating by pipes 334 and 335 with the pedestal 92 of wrapper carrier 17. Thus, when the action of lever 110, at the time of transfer of the cut wrapper, closes the duct 323 and thereby shuts off the suction in die head 128, it simultaneously opens valve 332 and thereby admits suction to the carrier head 17. In Fig. 19 the positions of the valves 325 and 332 are shown on plate 128 in approaching its uppermost location. When that point in its travel is reached valve 325 is rotated to close duct 323, thereby shutting off the suction in said duct, while valve 332 is rocked to allow the suction to be diverted into pipe 334. Since a similar structural arrangement is provided for the binder dies and binder transfer, it need not be described further herein.

The shaft 114 of die turret 115 is intermittently driven by an indexing member provided with a plurality of rollers 116 engaging with a track in cam 84 which is integral with cam 83. The rollers 116 are mounted on a disk 117 on a shaft 118 supported in housing 48 and carrying a gear 119 meshing with a gear 120 on a shaft 121 on which is also mounted a bevel gear 122 meshing with a gear 123 on shaft 114. Since the turrets are moved through 180° during each indexing thereof two rollers 116 are provided at diametrically opposite points on disk 117. The construction of the disk 117, rollers 116 and cam 84 may be similar to that shown in my Reissue Patent No. 19,677.

The cam 85 engages a follower 124 carried by a bell-crank lever 125 fulcrumed on shaft 42 and held in engagement by a spring 126, Fig. 2, the lever 125 being pivoted to a rod 127 (Figure 18) operating the transfer head 128 of the dies 15.

The gear 89 on cam shaft 41, Fig. 7, meshes with a gear 129 on a shaft 130 supported in housing 47, the latter gear meshing through an intermediate gear 113 (Figure 2) with a gear 131 on the shaft 132 of the wrapping device 14, see Fig. 2. To shaft 130 is also affixed a bevel gear 133 meshing with a bevel gear 134 on a shaft 135 carrying a gear 136 and a cam 351. The latter is employed to drive the bunch turret 137, which is mounted on housing 47, when the machine is used in connection with a short filler bunch machine, as shown in Fig. 9. While it is not essential that all of the parts of the short filler bunch forming machine run in synchronism with the rolling mechanism, it is necessary that the turret 137 operate in synchronism therewith in order that shaped bunches may be properly fed in timed relation to the rolling elements.

With cam 351 engage the rollers 352 of an indexing device 353 thereby imparting an intermittent rotation to shaft 354, on which is mounted a pinion 355 meshing with a ring gear 356 attached to bunch turret 137 which is loosely mounted on shaft 357. The gear 136 on shaft 135 meshes with a gear 358 fixed on shaft 357, and thus imparts continuous rotation to the latter shaft which drives the operating member of the pocket cover of the turret. The details of the turret 137, its drive and cover operating member are similar in construction to that shown in my co-pending application, No. 21,723, filed May 16, 1935, now Patent No. 2,157,537 granted May 9, 1939.

Cam 86 in a face track guides a follower 138 on a lever 139 swinging on shaft 43 and actuating a rack 140 extending upwards into the pedestal 141, Fig. 1, and operating the cigar transfer 23, see also Figs. 11 and 12. The periphery of cam 86 controls a follower 142 carried by an arm 143 of a lever 144 to which is pivoted a rod 145 operating the valve lever 146 of flag blow-off 22, in a manner similar to that shown in said Wheeler Patent No. 2,215,490.

The track of cam 87, which is integral with cam 86, engages a roller 147 on a lever 148 fulcrumed on shaft 43, the free end of this lever being pivoted to a rack 149 which, like rack 140, extends into pedestal 141 but actuates the bunch transfer 11. The complete structural arrangement of the bunch end cigar transfer is shown in Figs. 11 to 17, and is described hereinafter.

On the bunch transfer 11 is mounted a balance arm 150, Figs. 1 and 2, held by a spring 151 in its up-position 150' in which, on the swinging of the transfer along path 13 (Fig. 2), it engages the nose 152 of an arm 153 affixed to a vertical shaft 154 extending from pedestal 141. In its up-position, the lower end of the balance arm 150 rests on a plunger 155, Figs. 3, 3a and 3b, carrying a toggle joint 156 which is then in its down-position with transfer fingers 157 located apart for the entry of a cigar bunch B. In entering the fingers 157, the bunch B trips the toggle 156, thereby raising the plunger 155 and turning the balance arm 150 into its down-position in which it clears the nose 152 when the transfer arm 11 is moved through its prescribed arc.

When at any time the transfer fails to pick up a bunch, the toggle 156 is not tripped, balance arm 150 remains in its up-position 150', and shaft 154 will be rotated through a given angle by the arm 153. On the lower end of shaft 154 is attached a switch 158 which is held open by the shaft 154 when the arm 153 is in its normal undisturbed position. If, however, as stated above the shaft 154 is moved by the balance arm 150, switch 158 closes contact 159 which is connected in series with a timing or limit switch 160, and with a solenoid 161, the limit switch being closed by the raising of a spring-tensioned roller 162 through its engagement with a cam piece 163, attached to the periphery of cam 82. The solenoid 161 when energized at the proper moment by the co-action of switches 158 and 160, pulls a lever 164 pivoted on a stud in bracket 165 into the path of the lifter lever 125 actuating the rod 127 which operates the lifter head 128 and transfers the cut wrapper from the die 15 to the wrapper carrier 17, thereby preventing the same from rising to effect such transfer.

Thus, there is provided an automatic inspecting mechanism which detects the presence or absence of bunches in the transfer device. By means of this device the feed of wrappers to the rolling or wrapping mechanism is so controlled that a wrapper cannot be transferred from the cutting die for transfer to the wrapping station unless a bunch has indicated its presence in the bunch transfer member. Obviously, this makes possible an appreciable savings in the wrappers which are an expensive item in cigar manufacture, since it prevents the waste of the wrappers fed to the rolling mechanism whenever a bunch is not transferred thereto for association with the particular wrapper. This structure, therefore, adds much to the efficiency and practicality of the machine, and tends to lower the cost of production of the cigars made thereon.

The cam 82 carries a cam piece 163, the latter opening a limit switch 167, through engagement with a follower 168 carried by said switch and thereby stops the machine at the end of each cycle of the machine. The limit switch 167 is shunted by a circuit containing the foot switches 33 and 34 in series so that the latter can start the machine from zero (provided the manual switches 31 and 32 are closed), but, if released during a cycle, cannot stop it until the cycle is completed. When the machine is operated as a long filler combination and the foot pedals are released, springs 169 connected thereto draw them upward against their respective stop screws 170 (Figure 2), thereby opening the switches 33 and 34. However, if both foot pedals are kept depressed, the machine will run continuously.

A different switch arrangement obtains when the machine is operated as a short filler combination, see Fig. 8c. It may happen that the bunch operative operating the bunch making machine falls behind for some reason and must stop the operation of the rolling machine, and rotation of turret 137 in order to catch up and fill the turret pockets, also, if for any reason she is subjected to danger and it is necessary to stop the rolling machine, this may be done at once by depressing the foot pedal which normally maintains switch 34' closed. The switch arrangement in the case of the long filler combination is different from that just described because, as shown in Figure 10, in the long filler bunch forming combination all bunches are moved automatically from one unit to another. A different condition exists in the short filler combination, however, where each bunch is transferred manually from the bunch making mechanism to the mold turret on the wrapping unit thereby making a different method of control advisable. When switch 34' is opened the circuit is broken and the machine stops, regardless of the position of the limit switch 167 which normally causes a cyclical stoppage of the machine.

On the free end of worm shaft 52 is mounted a sprocket 171, Fig. 2, which by means of a chain 172 drives the sprocket 173 of a pump 174. The latter is mounted on a bracket fastened to shaft 46, Fig. 2, and supplies compressed air to a reservoir 175 which is connected by pipes 176 to the hollow pedestal 177 which carries the flag blow-off 22. Integral with the hub of sprocket 171 is a bevel gear 178 meshing with a bevel gear 179 on a shaft 180 supported in end frame 38, the end of shaft 180 being adapted to receive a hand lever 181, Figs. 9 and 10, for cranking the machine by hand.

Figure 8:
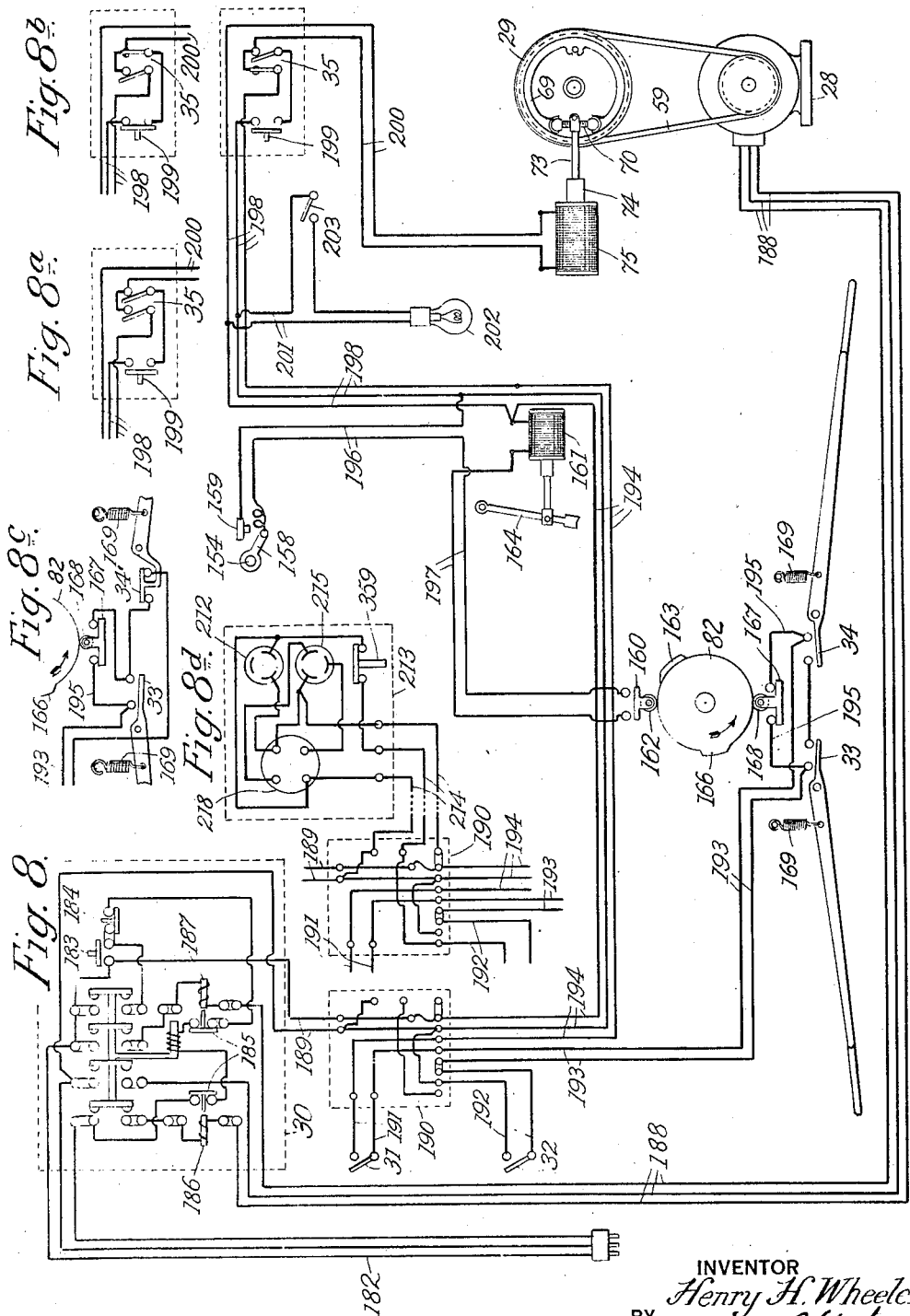
Fig. 8 is a diagram of the electrical connections for operating the rolling machine and a short filler bunch forming mechanism associated therewith.

A diagram of the electrical connections for controlling the improved cigar rolling machine is shown in Fig. 8. A 3-wire electric cable 182 is provided with means such as a conventional plug for connecting the starting switch 30 of the machine to the line socket of the power line. The starting switch is mounted within the wrapper carrier pedestal 92 with only the start button 183, the stop button 184, and the reset button 185 protruding through an opening in the casting, Fig. 1. The reset button 185, when pushed after one of the overload relays 186 or 187 has broken the circuit, restores its contact and when the "on" button is again depressed the motor is set into operation and restarts the machine. From the starting switch 30, an electric cable 188 leads to the motor 28 and a cable 189 runs to a connecting box 190 to which the hand switches 31 and 32 are connected by cables 191 and 192, respectively. From box 190, a cable 193 runs to the foot switches 33 and 34 and limit switch 167, and a cable 194 runs to the solenoid 161. From solenoid 161, a cable 196 leads to the wrapper control switch 158—159, a second cable 197 to the limit switch 160, and a third cable 198 to the jogging switch 35 which is shown in the running position. Fig. 8a shows the position of the switch 35 for stopping the machine, and Fig. 8b for jogging, the machine in the latter position of the switch running for a short time as long as the contact button 199 is depressed. A cable 200 connects the jogging switch 35 with the solenoid 75 which controls the expansion ring 69 actuating the main clutch 29 of the machine.

A cable 198 is tapped by a cable 201 leading to a lamp 202 mounted in the substructure of the machine so as to illuminate certain operating mechanism for making adjustments when the lamp switch 203 is closed, the housing of the wrapping device 14 being for this purpose provided with a suitable aperture.

As mentioned hereinabove, the cigar rolling machine of the present invention has been designed to enable it to work equally well with either a long or a short filler bunch forming machine, so that with but a minimum of effort a long filler bunch forming machine may be substituted and be set in working order with the rolling machine, and conversely.

Due to the fact that the bunch and cigar transfer mechanism 11 and 23 respectively are mounted to operate in a single pedestal 141 located on the table of the cigar rolling machine, there is no necessity for changing and adjusting the bunch transfer structure except for the gripper heads since they have been designed to function with either a long or a short filler bunch forming device. This has also been brought about by the fact that the point of transfer of the bunches from the cigar bunch shaping units, turret 137 of the short filler unit, and member 260 of the long filler machine, will occupy the same relation with respect to transfer arm 11 regardless of the combination of units used, whereby the arm 11 remains of constant length in either combination.

In Fig. 9, the combination of the improved cigar rolling machine with a short filler bunch machine is shown. The bunch forming machine mechanism may be of the type shown in British Patent No. 503,132, which discloses a hopper adapted to contain a bulk supply of tobacco which is fed intermittently therefrom to the bunch forming device. In this case, the continuously running inner drive shaft 56 of the rolling machine is coupled to the drive shaft 204 of the bunch machine by a coupling 205, the latter drive shaft by gears 206 driving a clutch 207 similar in construction to the clutch 29. The bunch forming machine is intermittently driven from shaft 204 through the clutch 207 under the control of foot pedal 362 at a much higher rate of speed than the rolling machine so that a sufficient number of bunches may be supplied to the pockets of turret 137. For example, if the output of bunches from the rolling apron 230 be set at, say, twenty-one per minute the rolling machine may be set to produce, say, twelve cigars per minute. In this manner the numerous pockets of the turret 137 are maintained substantially full. The speed is of course set so that the best possible output of the machine can be obtained. The clutch 207 is controlled by a solenoid 208 receiving its current by a cable 209 from a connecting box 210 which through a cable 211 is wired to a socket 212 of a switch box 213 on the table of the machine. Gear 224 on shaft 207a drives gear 501 on shaft 509 of the short filler bunch forming mechanism (Figure 9). Treadle 362 fulcrumed on a shaft 510 of the bunch forming mechanism is provided with a suitable extension 509 mounting a switch closing member 508 of any known type adapted to engage contacts 511 and close a circuit through wires 209 whenever the treadle is depressed whereupon solenoid 208 is energized to cause clutch 207 to drive shaft 208 and the various driving mechanisms of the short filler bunch forming device (not shown). The box 213 receives current by a cable 214 from the connecting box 199 of the rolling machine and also has a socket 215 connected by a cable 216 with the heater 217 in the bunch turret 137, this heater being controlled by a switch 218 on box 213. In Figure 8, the connections of box 199 with foot controls 33 and 34 by cable 193 is shown, which allows clutch 207 to be controlled by the foot pedals. A micro-switch 359 (Figure 8d) controls the operation of the rolling machine and thereby prevents injury to the operator feeding the bunch turret. This mechanism may be constructed to operate in a manner similar to that shown in copending application, Serial No. 195,528, filed March 12, 1938, by J. P. Durning, now Patent No. 2,275,423, granted March 10, 1942. This switch is manually reset to reinstitute the operation of the rolling machine.

A bevel gear 219 on the drive shaft of clutch 207 meshes with a gear 220 on a shaft 221 supported in the side frame of the bunch machine and serves to crank the sun gear of the clutch 207 manually by a handle 222. A pulley 223 on shaft 204 and a gear 224 on the shaft 207a of clutch 207 drives the various operating units of the short filler bunch rolling machine, which may be of the type shown and described in the above referred to co-pending Durning application, namely the feed hopper 225 with the rakes 226 and the delivery door 227, the charge-weighing scale 228, the charge cutter 229 and the rolling table 230 with the bunch receiving clamp 231, from which the operator transfers the finished bunch to the turret 137, which may be of the type described in co-pending application No. 195,528, referred to above.

The short filler machine, above referred to and as shown in Fig. 9, may be equipped with a scrap drawer 232 into which lead pipes 233 and 234 from the rolling table and from a chute 235 at the bunch turret, respectively, the drawer 232 being connected by a pipe 236 with a pipe 237 rising from the suction outlet 238 of the rolling machine. The pipe 237 leads into the housing 48 of the turret 115 of the rolling machine and by a pipe 239 also connects with a duct in the pedestal 92 of the wrapper carrier from which a pipe 240 leads to the suction chamber 241 of paster 21. A chute 242 below the trimming end of re-roller 25 is connected by a pipe 243 with the suction system, the end of pipe 243 passing through chamber 48 and entering part way into suction pipe 237. The delivery position 11' of bunch transfer 11, and the receiving position 23' of cigar transfer 23 are shown in dotted lines.

In the long filler combination shown in Fig. 10 the clutch driven hollow shaft 52 of the rolling machine is connected by a coupling 244 to the drive shaft 245 of the bunch machine, so that all operating units of the latter are in synchronism with those of the former. The units shown of the long filler bunch machine are the filler feed 246, the filler cutter 247, the filler forwarding plunger 248, the charge cutter 249, the latter group operated by mechanism enclosed in a housing 250; the charge transfer 251, the rolling table 252, the binder die turret 253, the binder cutting rollers 254, the binder transfer 255, the binder carrier 256, the binder paster 257, the bunch softener 258, the bunch transfers 363 and 364 and locator mechanism 259, and the bunch shaper 260. All units of the bunch machine are controlled from the rolling end of the combination, the manual switch 32 and the foot lever 34 of the rolling machine being within easy reach of the operator serving the dies 261 of the binder turret 253. Near the latter, a chute 262 is provided in the table top of the bunch machine to quickly dispose of the scrap from the binder dies.

The construction of the bunch and cigar transfer, which carries the cigar bunches from the bunch machine to the wrapper applying device of the rolling machine, and, after wrapping transfers the cigar to the re-roller, is shown in Figs. 11 to 17.

The rack 149, which is actuated by cam lever 148 on shaft 43 and guided by a flanged wheel 263 engages a gear 264 on a shaft 265 supported in pedestal 141. The guide wheel 263 is mounted on an eccentric stud 266 thus permitting accurate adjustment of the tooth engagement. The shaft 265 passes through the hub of a bevel gear 267 which is held fast to pedestal 141 by a bolt 268. On shaft 265 is turnably mounted the flanged hub of the hollow arm 11 in which is journaled a shaft 269 carrying at its ends bevel gears 270 and 271. Shaft 265 has a crank arm 272 which is detachably connected to arm 11 by means of a spring-tensioned ball-top plunger 273 fitting into a steel socket 274 inserted into the hub-flange of arm 11. The gear 270 at the inner end of shaft 269 meshes with the fixed gear 267, and the gear 271 at its outer end engages with a gear 275 on a horizontal shaft 276 journaled in arm 11 and carrying the bunch holder 277. The turning of the gear 270 as it rolls on the stationary gear 267 rotates the horizontal shaft 276 by an angle equal to that through which the arm 11 is moved by the crank 272, thus keeping the bunch holder 277 in its vertical position at all times and at any angle of arm 11. Therefore, when a bunch or cigar is to be lifted or delivered, the grippers are always properly positioned for correct operation. the arm 11 has two adjustable stop screws 278 which engage alternately with a stop 279 in either position 11 of the transfer arm, corresponding to the spaced position B (Fig. 11) of the cigar bunch, in the bunch-machine turret and in the wrapping device, respectively. In case the stroke of rack 149 is made slightly greater than required for the correct adjustment of the screws 278, the plunger 273 leaves the socket 274 at the end of each stroke and snaps back at the beginning of the next, and no damage is done to the mechanism.

The rack 140 which is actuated by link 280 on cam lever 139 is kept in lateral alignment by a guide block 281 fitted into pedestal 141 and fastened to base 12 and held in tooth engagement with a gear 282 on a shaft 283 by a flanged wheel 284 on an eccentric stud 285. The shaft 283 passes through the hub of a bevel gear 286, held stationary in pedestal 141 by a screw 287, and carries the transfer arm 23, the stop screws 288 of which engage with a stop 289 at its end position, corresponding to the positions C (Fig. 12) of the cigar in the wrapping device and in the re-roller, respectively. The arm 23 has the shafts 290 and 291 with the bevel gears 292, 293 and 294, the horizontal shaft 291 on a cross stud 295 loose in its fork end 296 carrying the cigar holder jaw 297 which is held in tension by a spring 298 pressing against pins 299 and 300, and is opened and closed against a stationary cigar holder plate 201 attached to fork 296 by a pin 302 in a collar 303 fast on stud 295, the said pin being controlled by a cam piece 304 attached to arm 23.

When the transfer is used in the short filler bunch combination shown in Fig. 9, the cigar bunch B is turned through a right angle while being transferred from the bunch machine to the rolling machine. The horizontal shaft 276 of the transfer arm 11 carries a bevel gear 305, Figs. 16 and 17, fixed to said shaft and meshing with a gear 306 on the holder 277 which in this case is loose on a vertical core 307 clamped to the end of shaft 276. The tooth ratio of gears 305 and 306 is so chosen that gear 306 moves in excess of one-quarter revolution with the spring overthrow stops as gear 305 turns through an arc equal to that between the extreme position B—B of transfer arm 11, i. e., the arch indicated by arrow 13 in Fig. 11.

The shaft 154 of arm 153 is held in position through friction produced by a spring 308 pressing on the clamp 309 carrying the switch 158 which when turned by arm 153, connects the insulated terminals on contact piece 159. The nose 152 is held against a projection on arm 153 by a spring 310, permitting the balance arm 150 to continue its forward motion by turning the nose out of the way after the switch 159 has contacted, and to re-engage the same on its return motion so as to turn arm 153 back into neutral position.

It is to be noted that the transfer mechanism for conveying bunches and cigars to and from the various operating stations of the machine are substantially entirely enclosed and are extremely simple in construction and operation. This makes possible a more efficient transfer than known heretofore, and insures greater wearing qualities for the parts making up their organization, since dirt, dust and possible abrasives, which are often present in tobacco, cannot get into the working parts of the transfer. Furthermore, the safety of an operator is greatly increased due to the enclosing of all parts so that it is impossible for her to come into contact with said parts. Also, the cleaning of this mechanism can readily be effected without danger of clogging any of the parts since it merely requires a wiping of plain, rounded exterior surfaces.

The mechanism above described may be varied in construction within the scope of the claims hereunto appended, since the particular device selected to illustrate the invention is but one of many possible concrete embodiments thereof. The invention is not, therefore, to be restricted to the precise details of the structure shown and described.

What is claimed is:

1. The combination with a cigar rolling machine, of mechanism for selectively and detachably connecting either a complete long or a complete short filler bunch forming unit to said machine for synchronous cooperation therewith, means for driving said machine, and electric control mechanism associated therewith to permit jogging of said machine to move the parts of said machine and detachably connected selected bunch forming unit through increments of full cycles.

2. In a cigar machine, bunch rolling mechanism, bunch forming mechanism, and selective means associated with said rolling mechanism for driving either a complete long filler or a complete short filler bunch forming mechanism detachably connected to said rolling mechanism and in synchronism therewith.

3. The combination with a cigar rolling machine, of mechanism for selectively operating either a complete long or a separate and distinct complete short filler bunch forming unit, said mechanism including means driven by said machine and arranged to drive either said long or said short filler unit.

4. The combination with a cigar rolling machine, of mechanism for selectively operating either a long or a short filler bunch forming device in synchronism therewith, including a hollow shaft driven by said machine for coupling with said long filler bunch forming device, and a second shaft driven by said machine projecting through said hollow shaft for driving a short filler bunch forming device.

5. The combination with a cigar rolling machine, of means for selectively operating either a complete long or a separate and distinct complete short filler bunch forming unit in conjunction with said machine, said means including driving and driven members, and a device for coupling said members to operate said machine and a selected unit connected to said machine in synchronism.

6. The combination with a cigar rolling machine, of mechanism for operating either a long or a short filler bunch forming device in synchronism therewith, including a hollow shaft driven by said machine for coupling with said long filler bunch forming device, a second shaft projecting through said hollow shaft and driven by said machine for driving said short filler bunch forming device, and a clutch for coupling the drive of said machine to said hollow shaft to drive said long filler bunch forming device.

7. In a cigar machine, the combination with a device for rolling cigar bunches, of bunch forming mechanism juxtaposed in cooperative relationship with said device, selective means for driving said mechanism, comprising a clutch, a shaft controlled by said clutch for driving a long filler cigar machine, and a second driven shaft constructed and arranged to drive a short filler cigar bunch forming machine.

8. In a cigar machine, the combination with a cigar rolling mechanism constructed and arranged for selective operation with a complete long or a separate and distinct complete short filler bunch forming unit, of a short filler bunch shaping turret, provided with a plurality of bunch shaping pockets, detachably connected to said mechanism to operate in synchronism therewith, a short filler bunch forming unit detachably connected in operative relationship with said mechanism, a continuously driven shaft journalled in said mechanism, a clutch carried by said unit, a shaft adapted to be coupled with said clutch, means for engaging said last named shaft and clutch to feed charges of tobacco to said bunch forming unit for formation into bunches, said means including an electric circuit, an electrically controlled clutch engaging device, and controls in said circuit for operating said device to engage and disengage said clutch.

9. In a cigar machine, the combination with a cigar rolling device constructed and arranged for selective operation with a complete long or a separate and distinct complete short filler bunch forming unit, of a complete long filler bunch forming unit detachably juxtaposed in cooperative relation with said device, interconnected means for driving said device and unit in synchronism, said means including an electrically operated clutch, an electric circuit and members in said circuit arranged to operate said clutch, and control said driving means.

10. In a cigar machine, the combination with a cigar rolling device, of means forming a part thereof for driving either a long or a short filler bunch machine in synchronism therewith, said means including driving mechanism and means for controlling said mechanism to change the drive from one only capable of driving a short to one able to drive a long filler bunch making machine at a different speed.

11. In a cigar machine, the combination with a cigar rolling mechanism constructed and arranged for selective operation with a complete long or a separate and distinct complete short filler bunch forming unit, of a bunch shaping turret provided with a plurality of mold pockets arranged to receive bunches connected detachably to said mechanism to operate in synchronism therewith, short filler bunch forming mechanism, a continuously driven shaft mounted in said rolling mechanism, a clutch, a shaft arranged to be coupled with said clutch, means for engaging said shaft and clutch to operate said bunch forming mechanism to form bunches to be placed in said pockets, and a device for conveying bunches from said turret to said rolling mechanism.

12. In a cigar machine, the combination with means for rolling cigars, of a bunch forming device juxtaposed in cooperative relationship with said means, mechanism for driving said device comprising a clutch, a member driven by said clutch arranged to drive a long filler bunch forming device, and a continuously driven member constructed and arranged to drive a short filler cigar bunch forming device.

13. In a cigar machine, the combination with means for rolling cigars, of a bunch forming device juxtaposed in cooperative relationship with said means, mechanism for driving said device comprising a clutch, a member driven by said clutch arranged to drive a long filler bunch forming device at one speed, and a continuously driven member constructed and arranged to drive a short filler cigar bunch forming device at another speed.

14. The combination with a cigar machine, including a bunch rolling station, of mechanism for selectively operating either a long or a short filler bunch rolling device in conjunction therewith, said mechanism including means driven by said machine and arranged to drive either said long or short filler device, a clutch, a hollow shaft, a solid shaft projecting through said hollow shaft, means for continuously rotating said solid shaft, means for connecting said long filler bunch forming device to said hollow shaft, or for selectively connecting said solid shaft to said short filler bunch forming device for cooperation with said cigar machine.

15. The combination with a cigar rolling machine having means for rolling a bunch and a wrapper into a cigar, of means for selectively associating either a long or a short filler bunch forming mechanism in operative connection therewith, said means including a shaft, a second shaft located adjacent said first shaft, means for continuously rotating said second shaft to drive said short filler bunch mechanism, and a clutch to connect said first shaft for establishing driving relationship between said cigar rolling machine and a long filler bunch machine when the latter is juxtapositioned in operative relationship with said cigar rolling machine.

16. In a cigar rolling machine having a cigar rolling station, a wrapper cutting die, and a wrapper carrier for moving wrappers from said die to said station, a complete detachable bunch forming mechanism connected in operative relationship with said machine, driving mechanism carried by said machine, means for interrupting the operation of said driving mechanism at least once during each cycle of said machine, said means comprising an electric circuit, a member cyclically controlled normally closing said circuit, a device engaging said member at least once during each cycle of said machine to break said circuit and stop the operation of said machine, and other means in said circuit adapted to maintain said circuit closed and said machine in operation despite the operation of said member.

17. In a cigar machine provided with a cigar rolling mechanism having a wrapper cutting die, and means for transporting wrappers from said die to said mechanism; a complete bunch forming mechanism detachably connected therewith and operating in synchronism therewith, a continuously rotating shaft journalled in said rolling mechanism, an electrically controlled clutch mounted in said bunch forming mechanism, connections between said shaft and said clutch for effecting the drive of said bunch forming mechanism, an electric circuit controlling the operation of said clutch, means normally maintaining said circuit closed to continue the operation of the machine, and means for breaking said circuit to stop the operation of the machine at least once during each cycle.

18. In a cigar machine provided with a cigar rolling mechanism constructed and arranged for selective operation with a complete long or a separate and distinct complete short filler bunch forming mechanism, means for detachably connecting said mechanisms for synchronized operation, a device for driving said mechanisms comprising an electric circuit, means for breaking said circuit at least once during each cycle of said machine, devices for continuing the normal operation of said machine despite the operation of said last named means, and means allowing one of said devices to interrupt the operation of said machine at the will of an operator whenever a short filler bunch forming mechanism is connected in operating relationship with said rolling mechanism.

19. In a cigar machine having bunch forming and cigar rolling mechanisms, means for detachably associating said mechanisms in operative assembly, means for driving said mechanisms in synchronism including a driving motor, a motor starting switch, driving and driven members, control devices for said members comprising an electric circuit, manually operated switches on said rolling mechanism for opening and closing said circuit, devices for stopping the operation of said mechanisms at least once during each cycle of said machine, and foot control switches connected in said circuit, and arranged to maintain either one or both mechanisms of said machine in operation despite the operation of said devices.

20. In a cigar machine, the combination with detachably associated bunch forming and cigar rolling mechanisms provided with frames, of a clutch for driving said mechanisms in synchronism, control devices for said clutch comprising an electric circuit, manually operated switches mounted on the frame of said rolling mechanism for opening and closing said circuit, a device for automatically breaking said circuit at least once during each cycle of said machine to stop the operation of said machine, foot controlled switches arranged to maintain said circuit closed regardless of the operation of said device, and a jogging switch also connected in said circuit and arranged to permit the operation of said machine through increments of a cycle.

21. In a cigar machine, the combination with a detachable complete bunch forming unit and a cigar rolling mechanism constructed and arranged for selective operation with either a complete long or a separate and distinct bunch forming unit associated together in operative assembly, of a driving motor, a motor starting switch, a clutch for driving said assembled and connected mechanisms, control means therefor comprising an electric circuit, a rolling mechanism frame, manually operated switches located on said frame of said rolling mechanism for opening and closing said circuit, a device for stopping said machine at least once during each cycle thereof, and foot switches connected in said circuit, one of said switches adapted to normally close and the other adapted to normally break said circuit independently of the operation of said device.

22. In a cigar machine provided with a bunch rolling mechanism, and a short filler forming device including a short filler bunch shaping turret operating in synchronism with said mechanism, means for detachably securing said turret in operative relationship with said mechanism, said means being constructed and arranged to allow said turret to be removed whereby a separate and distinct complete long filler bunch forming device can be positioned to cooperate with said rolling mechanism, and means for coupling either of said devices in synchronized relationship with said mechanism.

23. A cigar rolling machine constructed and arranged for selective operation with a complete long or a separate and distinct complete short filler bunch forming unit, comprising means selectively connecting either said complete long or said complete short filler bunch forming unit with said rolling machine to cooperate therewith, including a separate drive for either unit journaled in said machine, mechanism for coupling a selected drive with either of said selected units, said mechanism including an electrically controlled clutch, an electric circuit, and manually and automatically controlled switches in said circuit for operating said clutch to control the drive of said rolling machine and the selected bunch forming unit associated therewith.

HENRY H. WHEELER.